United States Patent [19]
Brooks et al.

[11] Patent Number: 5,544,206
[45] Date of Patent: Aug. 6, 1996

[54] REACTOR HEAD WORK STATION

[75] Inventors: Raymond J. Brooks, Ontario; John M. Gay, Pittsford; Bruce A. Weir, Ontario; Paul E. McEntee, Rochester; Lauren Blood, Livonia Center, all of N.Y.

[73] Assignee: R. Brooks Associates, Inc., Williamson, N.Y.

[21] Appl. No.: 261,485

[22] Filed: Jun. 17, 1994

[51] Int. Cl.⁶ .................................................. G21C 17/00
[52] U.S. Cl. .................... 376/248; 376/24.9; 376/245; 376/250
[58] Field of Search .................... 376/248, 249, 376/245, 250; 976/DIG. 210; 354/127.1, 148, 223

[56] References Cited

U.S. PATENT DOCUMENTS

| | | | |
|---|---|---|---|
| 3,764,736 | 10/1973 | Kosky et al. | 178/7.81 |
| 3,780,571 | 12/1973 | Wiesener | 73/67.88 |
| 3,916,701 | 11/1975 | Butler | 74/57 |
| 4,311,556 | 1/1982 | Iwamoto et al. | 376/249 |
| 4,460,920 | 7/1984 | Weber et al. | 358/100 |
| 4,526,037 | 7/1985 | Wentzell et al. | 73/640 |
| 4,643,867 | 2/1987 | Hornak et al. | 376/248 |
| 4,656,509 | 4/1987 | Matsuyama et al. | 358/100 |
| 4,661,308 | 4/1987 | Takenaka | 376/245 |
| 4,668,981 | 5/1987 | Egger | 358/100 |
| 4,671,478 | 6/1987 | Schoenig et al. | 248/124 |
| 4,702,878 | 10/1987 | Klug et al. | 376/249 |
| 4,849,778 | 7/1989 | Samuelson | 354/81 |
| 4,857,261 | 8/1989 | Marshall et al. | 376/248 |
| 5,305,356 | 4/1994 | Brooks et al. | 376/249 |

*Primary Examiner*—Donald P. Walsh
*Assistant Examiner*—Meena Chelliah
*Attorney, Agent, or Firm*—Duane, Morris & Heckscher

[57] ABSTRACT

Apparatus for inspecting the nuclear reactor comprising a boom rotatably connected by a pivot point to the top of a reactor head, a mechanism for rotating the boom with respect to said pivot point, a camera affixed to said boom and being slidingly affixed thereto such that the camera may be slidably adjusted in a longitudinal direction with respect to said boom.

12 Claims, 7 Drawing Sheets

REACTOR HEAD WORK STATION

FIELD OF THE INVENTION

The present invention is directed to the field of nuclear reactor inspection and repair. In particular, the present invention is directed to an apparatus for inspecting nuclear reactors and power stations.

BACKGROUND OF THE INVENTION

In a nuclear reactor power plant, a nuclear reactor vessel is used to generate heat for the production of steam and electricity. The reactor vessel is typically a pressure vessel which encloses a core of nuclear fuel and cooling water which is often borated water.

In order to monitor the operating conditions within the pressure vessel, instrumentation devices are often introduced into the nuclear core through ports or penetrations in the vessel. Some of these penetrations are provided through the reactor vessel closure head.

The closure head may also provide for the penetration of drive mechanisms of control rods, which are used to regulate the rate of nuclear reactions which take place within the core, and which control the power output of the plant.

Although these ports are mechanically sealed to prevent the inadvertent leakage of coolant from the reactor vessel, the operating conditions of a nuclear reactor pressure vessel require additional safeguards. Typically, the pressure vessel maintains the coolant therein at an internal pressure of about 15 MPa (2250 psi) and at a temperature of about 315° C. (600° F.). Because of such an enlarged internal pressure, reactor coolant may leak from the mechanical joint of these penetrations, or when the control rods are withdrawn.

The coolant within a reactor vessel is typically acidic and highly corrosive due to the presence of boric acid which is dissolved within the coolant. Boric acid is a neutron absorber which is used as a variable reactivity control over the long-term operation of the plant. Even though there are regulatory limits on the allowable amounts of coolant which may be emitted from the reactor vessel, components on the exterior of and in close proximity to, the reactor vessel head need to be periodically inspected to determine if coolant is being emitted.

Because an operating nuclear reactor generates an irradiated environment, the inspection and/or maintenance of the reactor vessel is typically conducted at times when the reactor is shut down for normal inspection or maintenance procedures, such as, the refueling of the core. A usual tell-tale sign of the presence of a leak in this area is white boric acid crystal deposits on the reactor vessel head. Any of several methods for determining the presence of a possible leak source may be used, but verification of the existence of a leak, estimation of its size, and the identification of its location is best done visually.

Generally, control rod drive mechanisms and instrumentation ports are enclosed by a cooling shroud. The shroud provides protection for the drive mechanisms, as well as a means for directing the flow of air around the ports for natural circulation, thereby cooling of the ports and drive mechanisms. This can make it even more difficult to visually detect the presence of borated coolant in this area as well as perforations in the shroud of the reactor.

A number of patents are directed to nuclear power plant inspection and inspection devices and in particular, devices for inspecting nuclear reactors. U.S. Pat. No. 4,857,261 to Marshall discloses a monitoring system for use in a nuclear reactor head area. The monitoring system disclosed in the Marshall patent comprises a plurality of video cameras attached to a cooling shroud on the vessel head. A right-angle lens is attached to each video camera and a halogen light source is attached to the shroud adjacent to each video camera to provide adequate lighting.

U.S. Pat. No. 3,780,571 to Wiesener discloses a device for inspecting nuclear reactor pressure vessels, which can be removed from the vessel when the vessel is in service and later replaced in the same position to make inspections. The device includes means for handling inspection of equipment, such as cameras, ultrasonic detectors or the like, and is moveable in several motions to permit it to operate in all areas of the vessel.

U.S. Pat. No. 4,311,556 to Iwamoto discloses a system for the inspection of the inside of a nuclear reactor vessel which utilizes a working unit and monitor for monitoring the movement of the working unit by a manipulator. The manipulator is a 2-arm structure, one of which is equipped with a working unit and the other of which is equipped with a television camera to continuously image the condition of the working unit.

U.S. Pat. No. 4,460,920 discloses an automatic traveling tube-interior manipulator for the remotely controlled transportation of testing devices and tools along given feed paths. The manipulator has a stepping mechanism that enables it to traverse narrow tube elbows or even vertical tube sections so that the test device tools attached to the manipulator head can be positioned and moved along their feed paths.

U.S. Pat. No. 4,643,867 to Hornak, et al. discloses a mounting system for a set of four television cameras upon a nuclear reactor refueling machine outer or stationery mast. The television cameras scan the reactor core fuel assemblies as they are being vertically removed from the core by the refueling machine during the performance of the refueling operation. In the alternative, the television cameras provide remote viewing of the reactor core in order to facilitate insertion of the fuel assemblies into the core during a refueling operation.

U.S. Pat. No. 4,656,509 to Matsuyama discloses a water leakage monitoring system for remotely monitoring leakages of water from monitored members and equipment disposed in a plant. The drive of the Matsuyama patent comprises a remotely controlled carriage which intermittently travels along an inspection route, a television camera hung from the carriage so as to monitor water leakage through each of the monitored members along the inspection path through the operation of an attitude adjusting mechanism in response to an attitude control signal. A coating composition applied to the surface of each of the monitored members changes in color when it is wet with water leaked through the associated member.

U.S. Pat. No. 4,661,308 to Tokinaka discloses a remote-controlled mobile inspecting and monitoring system which comprises a rail laid along an inspection route, power lines provided along the rail, and an inspection vehicle carrying inspecting and monitoring equipment to move along the rail. A power receiving unit mounted on the inspection vehicle is connected to the power lines such that the inspection vehicle carries a battery unit for supplying power to on board equipment and a change over unit for controlling the power receiving unit so as to be connected to or disconnected from the power lines. The system is capable of reducing the load on the battery unit by receiving power through the power receiving unit from the power lines so that a battery unit of reduced capacity is needed, thereby making it possible to reduce the size of the inspection vehicle.

U.S. Pat. No. 4,668,981 to Egger discloses a system for performing visual inspection of water-immersed portions of a nuclear reactor vessel. The system utilizes the manual manipulation of a television camera through which the reactor components are viewed. A television camera is suspended within the reactor vessel from a first hand held line by an individual positioned on a platform above the open top of the vessel. The camera is carried on a positioning device which includes a pair of arms extending outwardly to terminal ends on opposite sides of the camera axis. Lines attached to each of these arms are held by a second individual, also positioned on the platform, at a distance from the first individual. A third individual is positioned at a television monitor to view the image relayed by the camera, and to direct the other two individuals in its deployment.

U.S. Pat. No. 4,702,878 to Klug, et al, discloses an apparatus for remotely inspecting and cleaning areas between the tubes on a tube sheet in a nuclear steam generator. A flexible tube is connected to one end of the sled and has at its other end extending out through an opening. The tube is of sufficient length to be freely movable into and out of the shell opening to move the sled along the periphery of the tube sheet. A probe such as a television camera or a fiberscope and a gripper are mounted on the sled for searching and retrieving objects.

Finally, U.S. Pat. No. 4,729,423 to Martin discloses a process and apparatus for optically checking the shape and dimensions of the ends of the tubes of a steam generator. A photographic camera is placed parallel to the tubular plate inside the water tank and exposures are made with the camera in different positions so as to obtain at least two views at different angles of the tubes which have to be checked.

None of the prior art discussed above discloses a nuclear reactor inspection device which can fully inspect a reactor head and which can be used in association with a plurality of movable members which permit the complete visual inspection of the reactor and reactor head. It would be desirable to provide a nuclear reactor inspection device which can easily inspect the reactor head of a nuclear reactor and which can be utilized to inspect selected portions of a reactor head including the control rod drive mechanism penetrations, the thermal sleeves, the funnels, and the annulus between the control rod drive mechanism and the thermal sleeves.

It would be particularly desirable to provide a nuclear reactor head inspection system which can rotate a full 360° and which can provide for full vertical and horizontal visibility and movement of a camera and light assembly. The present invention is directed to overcome the problems associated with prior art devices for inspecting the reactor head of a nuclear power plant. The objects and benefits of the present invention will become apparent from the detailed description and summary which follow.

SUMMARY OF THE INVENTION

In accordance with the present invention, apparatus for inspecting a nuclear reactor is disclosed. The invention comprises: a boom rotatably connected to a pivot point on a base; means for controllably rotating the boom with respect to said pivot point on said base; and a camera assembly affixed to said boom and being longitudinally slidable thereto such that the camera assembly may be slidably adjusted with respect to said boom.

In accordance with a more preferred embodiment, the present invention is directed to apparatus for inspecting the reactor head of a nuclear reactor comprising: a boom rotatably connected to a base at a pivot point, said base being affixed atop a nuclear reactor, said boom having a caster at one end such that said boom can rotate with respect to said pivot point and said caster; means for selectively rotating and positioning said boom and said caster about said pivot point; a camera slidably mated with said boom between first and second positions on said boom; means for slidably moving said camera between said first and second positions along said boom; means for rotating said camera means in a first direction with respect to said boom; and means for rotating said camera means in a second direction with respect to said boom.

In yet a further embodiment, the present invention is directed to apparatus for inspecting the reactor head of a nuclear reactor is disclosed comprising: a boom rotatably fixed about a pivot point on said reactor head, said boom having a caster at one end such that said boom can rotate 360° with respect to said pivot point and said caster; means for rotating said boom about said caster; camera and light means slidably mated with said boom such that said camera and light means can move between first and second positions on said boom; and means for moving said camera and light means between said first and second positions on said boom. These and other advantages of the present invention will become apparent from the detailed description and claims which follow.

DETAILED DESCRIPTION OF THE PREFERRED EMBODIMENT

Figure 1:
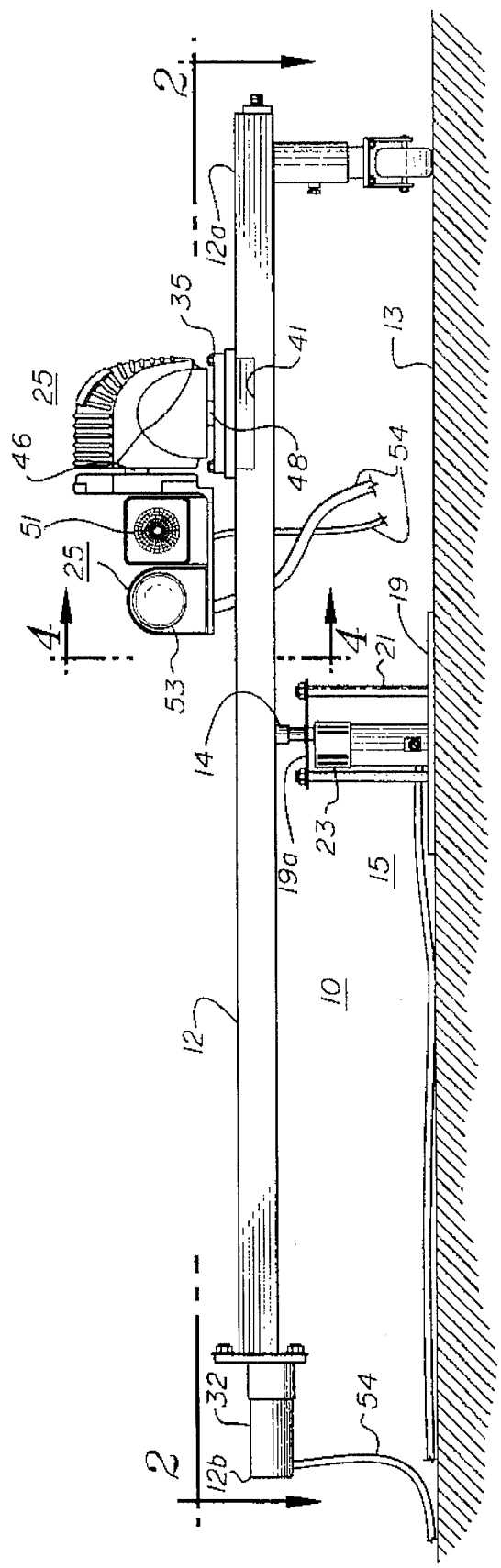
FIG. 1 is a side perspective view of the reactor head work station of the present invention.
Figure 2:
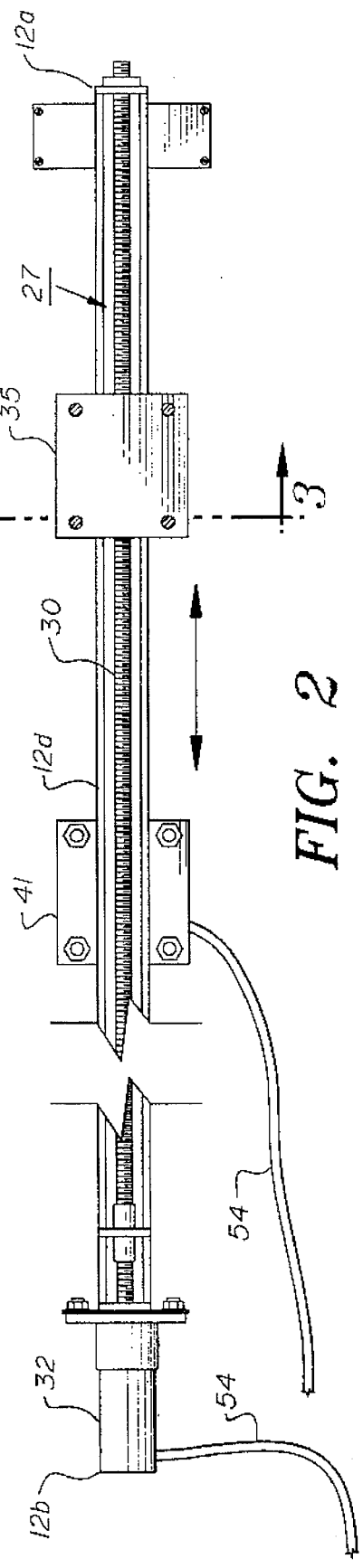
FIG. 2 is a plan view of the nuclear reactor head work station of the present invention along line 2—2 of FIG. 1.
Figure 8:
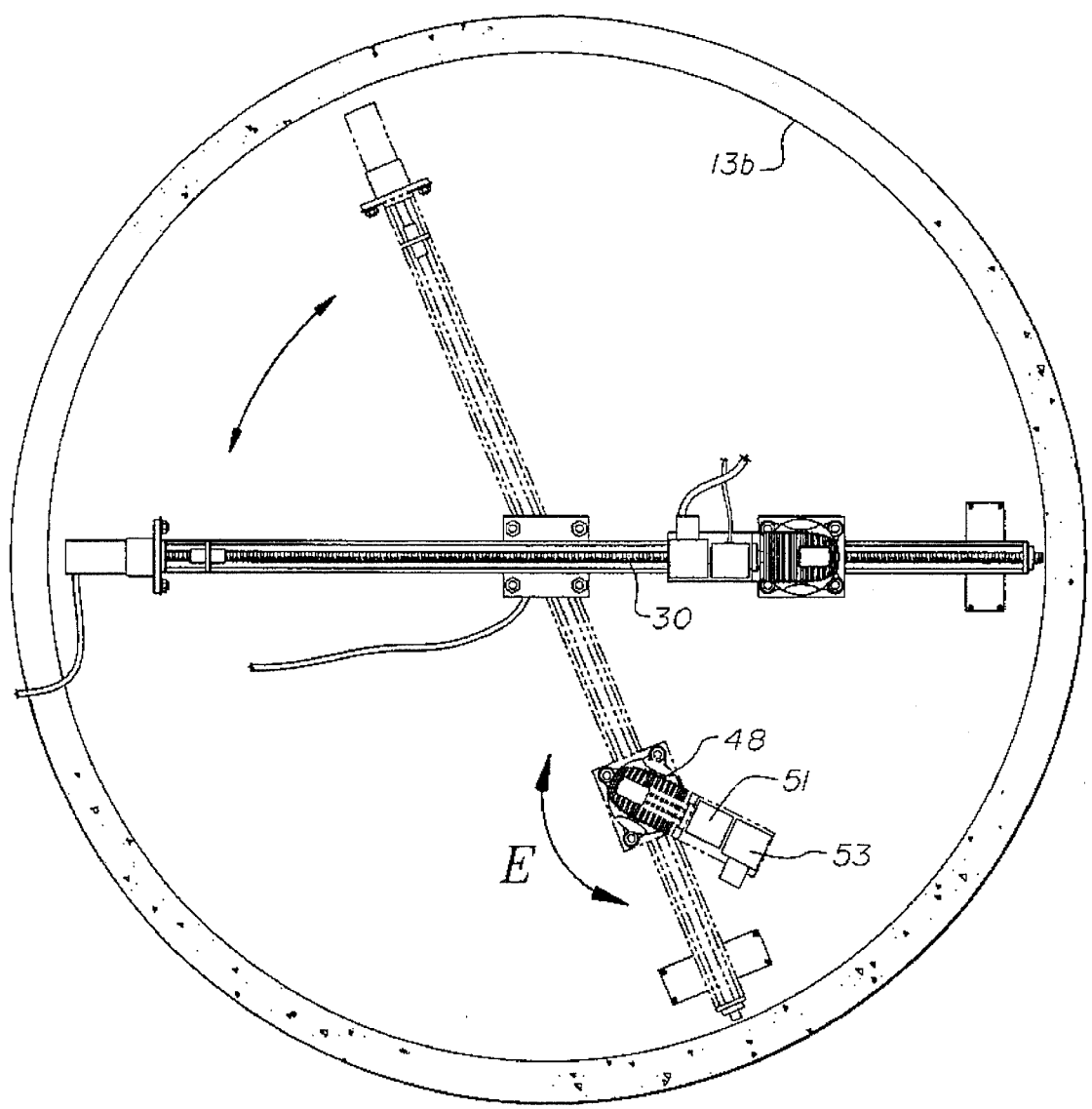
FIG. 8 is a plan view of the reactor head work station which illustrates the rotational movement thereof.

The present invention is described with reference to the enclosed Figures wherein the same numbers are utilized where applicable. Referring to FIGS. 1, 8, 9 and 10 perspective views of the nuclear reactor work station of the present invention are shown. The present invention, in one embodiment is intended to be situated, for example, atop a nuclear reactor head 13. As shown in FIG. 10, a nuclear reactor typically contains a plurality of vertically oriented rods 11 which are used to generate superheated or primary water which is then quenched by a secondary water source to produce steam. The reactor head 13 forms a flat bed 13a, and has a circular circumference 13b. The dome 17 of the containment vessel surrounds the reactor and reactor head. As shown in FIGS. 1, 2 and 8, the reactor work station 10, in a first embodiment, comprises a boom member 12 which is of sufficient length to extend at least the radius of the reactor head. It is to be appreciated that the boom member 12 may have a length of up to and including the diameter of the reactor head itself.

The boom member 12 rests substantially horizontally upon a rotational pivot point 14 which is supported upon a base 15 situated, for example, on the reactor head 13. Base 15 may comprise a structure-having two horizontal supports 19,19a separated by vertical rods 21. Base 15 encases an electric motor 23 which is in communication with rotational pivot point 14 off the boom member 12.

The rotational pivot point 14 enables the boom member 12 to rotate in a substantially horizontal direction with respect to the pivot point 14 via electric motor 23. In a preferred embodiment, the rotational pivot point 14 enables the boom member 12 to rotate a full 360 degrees. Electric motor 23 can comprise a servo, stepper or synchronous AC or DC motor.

Figure 7:
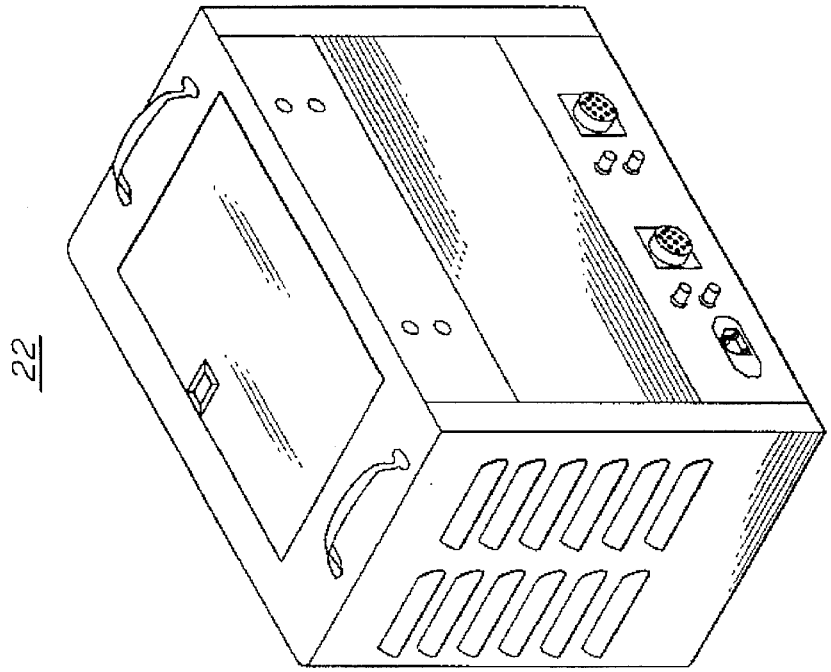
FIGS. 6 and 7 are elevational perspective views of a monitoring and control system for the reactor head work station of the present invention.
Figure 6:
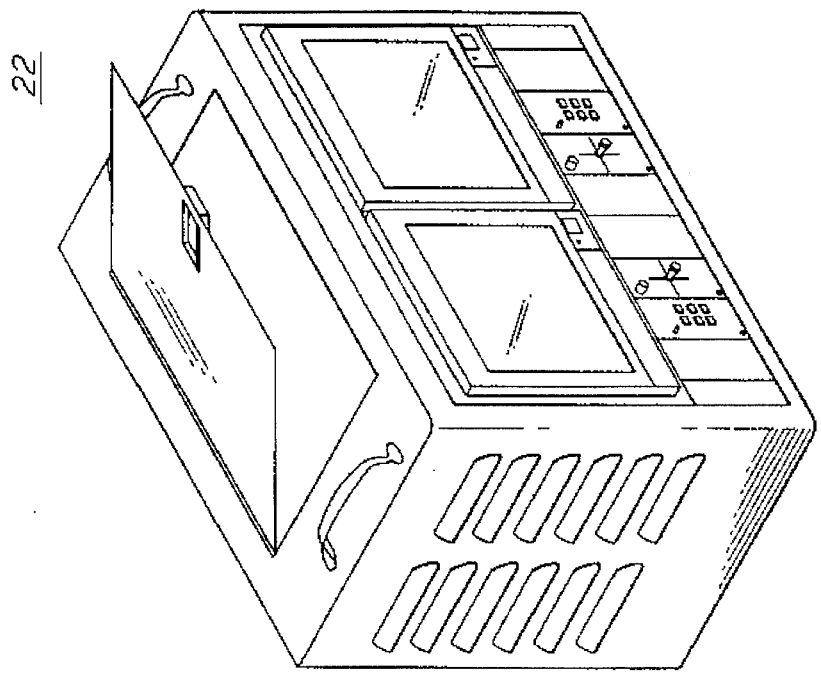

As shown in FIGS. 6, 7 and 10, the inspection device of the present invention is utilized in association with a control mechanism with CRT display 22. Such a control mechanism 22 is disclosed, for example, in U.S. Ser. No. 07/929,886, filed Aug. 11, 1992 entitled "Transportable Device And Method For Receiving And Displaying An Electrically Collected And Transmitted Image Of A Defined Environment", which is incorporated herein by reference as if set forth in full. The control mechanism 22 in one embodiment includes a control button panel 24 which facilitates the full control of the inspection device 10 and its electric motors to be disclosed herein. The control mechanism with CRT display 22 is attached to the system via control wires 54. It is to be appreciated that a remote control system is contemplated by the present invention.

Figure 3A:
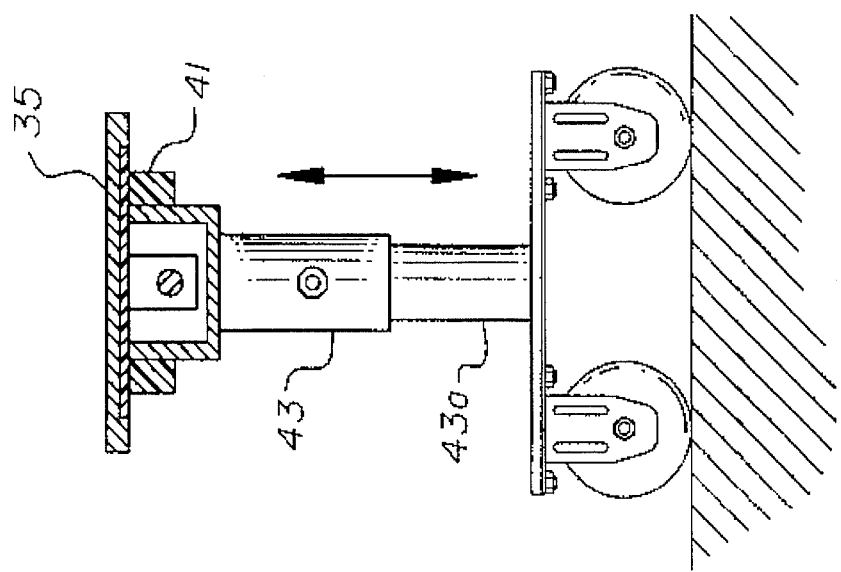
FIGS. 3 and 3A are partial section views of the reactor head work station along line 3—3 of FIG. 2.
Figure 3:
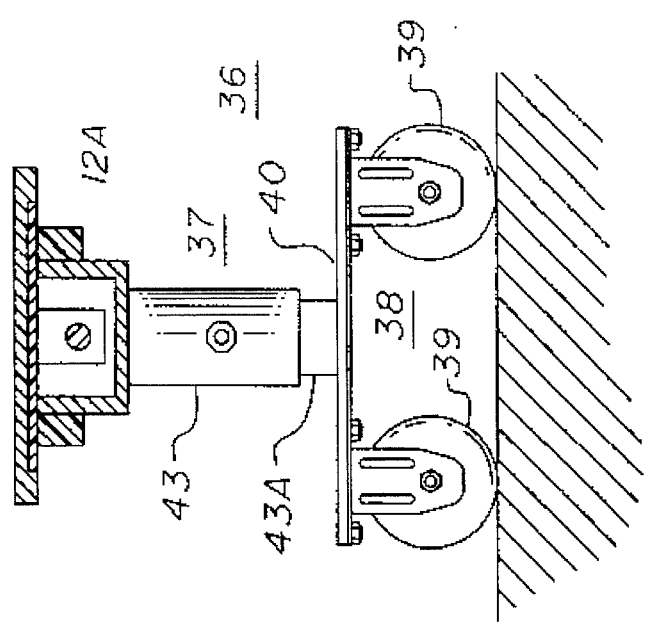
Figure 5:
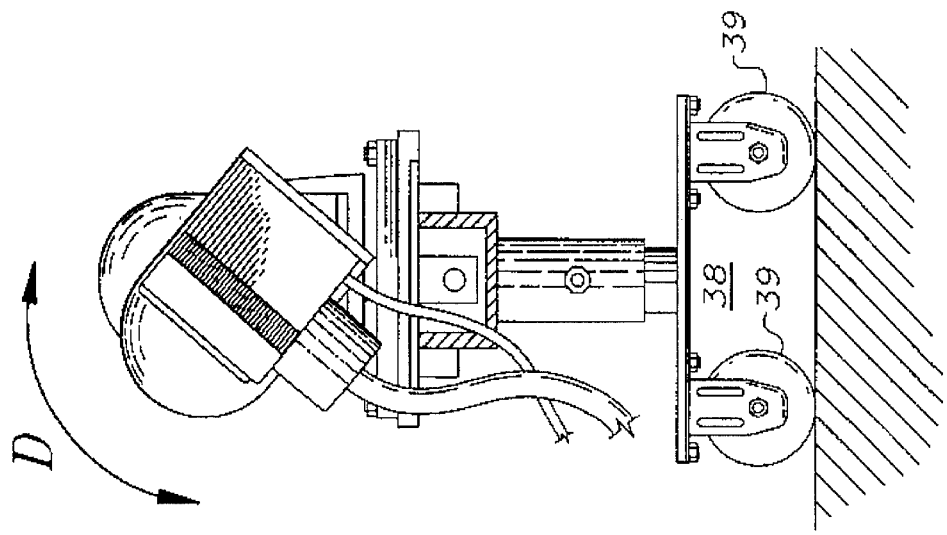
FIGS. 4 and 5 are partial section views of the reactor head work station which show the light and camera means along lines 4—4 of FIG. 1.
Figure 4:
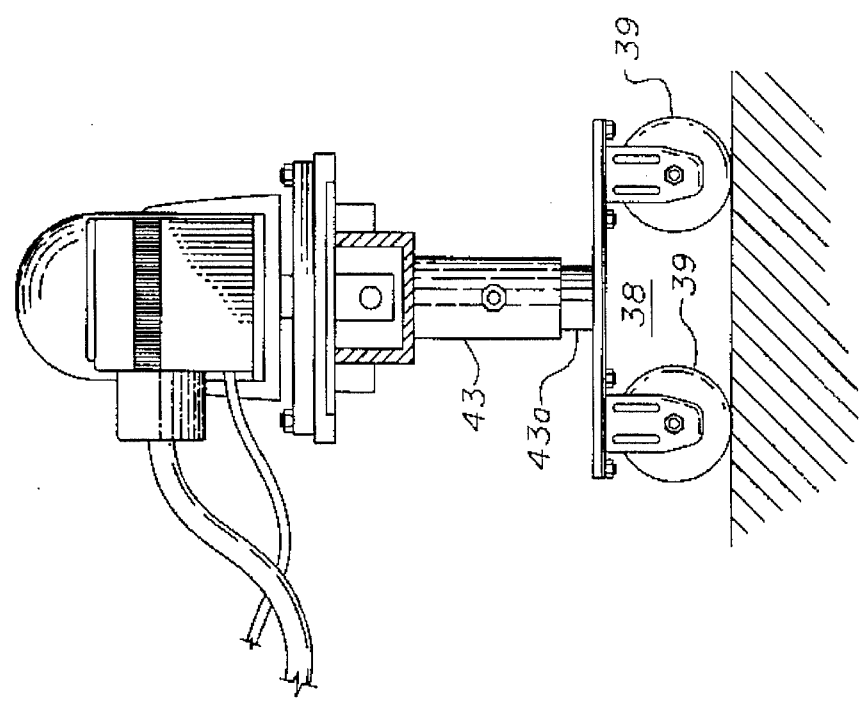

Referring to FIGS. 3 and 3A, first end 12a of the boom member 12 is supported by a roller assembly 36 comprising a caster or wheel 39 which is held in position by a vertical brace or support member 37. The caster or wheel 36 permits the boom member 12 to be rotated along the top of the reactor head 13 a full 360°. As shown in FIGS. 3 through 5, the roller, caster or wheel 36 may comprise a dual axle roller 38, i.e., two rollers 39 separated and affixed to a horizontal bed 40. The vertical support members 37 of the present invention may comprise telescoping members 43, 43a supported by air pressure or by a biasing spring. The use of telescoping members 43, 43a facilitates the smooth operation and rotation of the pivoting boom member 12.

As shown in FIGS. 1, 4, 5 and 9, a key feature of the present invention is the inclusion of a camera and light assembly 25 which is used to inspect the entire reactor and reactor head and which can be selectively moved and positioned into in a multitude of positions. The camera and light assembly 25 of the present invention may take a variety of forms and may include a CCD or video camera with halogen lamp. The camera and light assembly 25 can slide along the boom member 12 and be rotated in both the horizontal and vertical directions, in accordance with the system to be described herein.

As shown in FIG. 2, the present invention comprises means 27 for sliding the camera and light assembly 25 along the boom member 12 in a longitudinal direction. In a preferred embodiment, means 27 comprises a drive screw 30 which extends longitudinally along a recess 12d within the boom member 12, and which is rotatable by means of a second electric motor 32 which is situated at the second end 12b of the boom member 12. Camera and light assembly 25 are supported on a chassis 35 which is in threaded engagement with the drive screw 30 via a support plate 41. The drive screw 30 is powered by second electric motor 32 which rotates the screw in both the clockwise and counter clockwise directions. It is to be appreciated that other means, such as a chain and pulley arrangement may be used to slide the camera and light assembly along the boom member 12.

Figure 9:
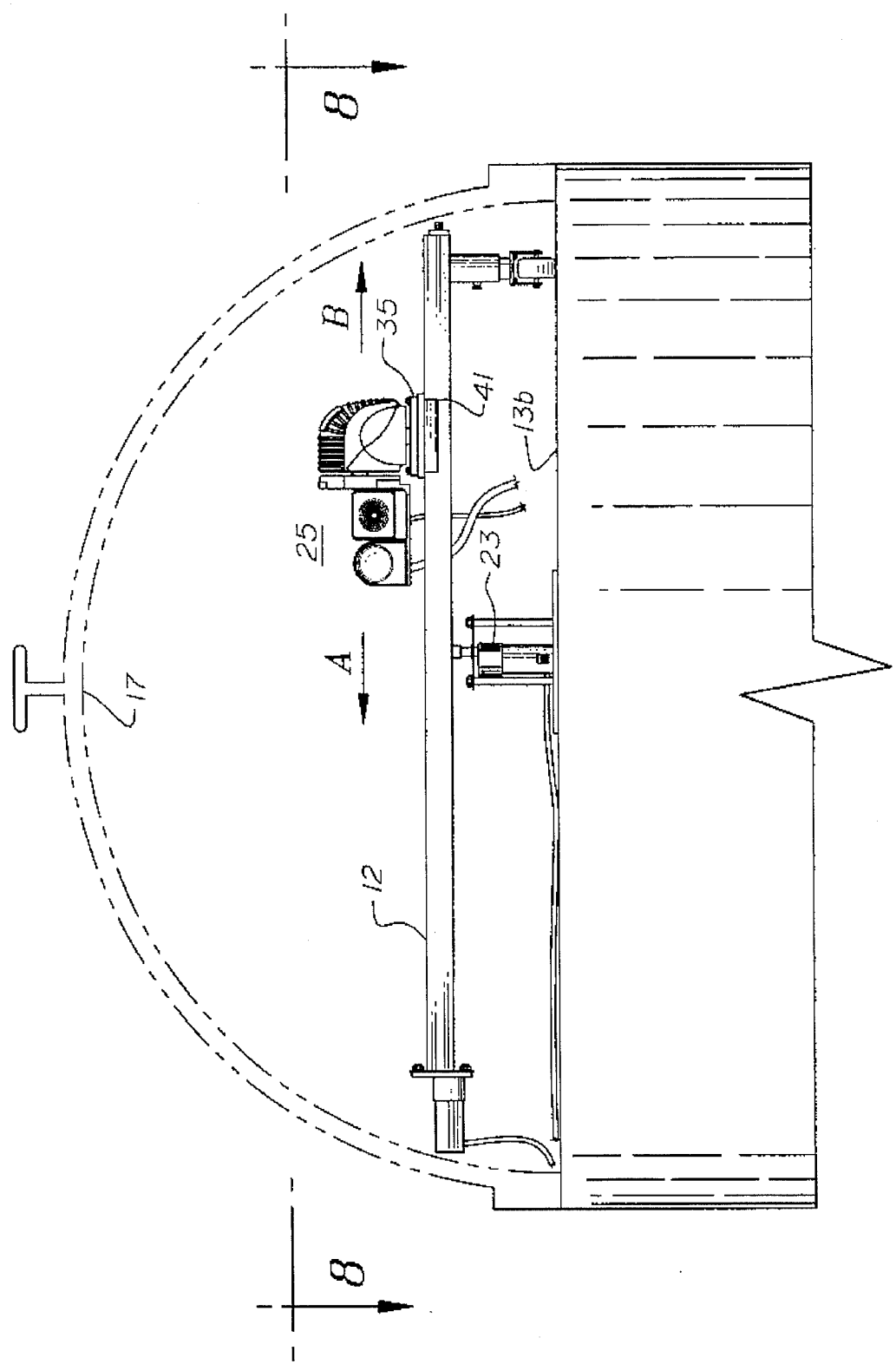
FIG. 9 is a partial section view of the reactor head work station which shows the movement of the camera and light means.
Figure 10:
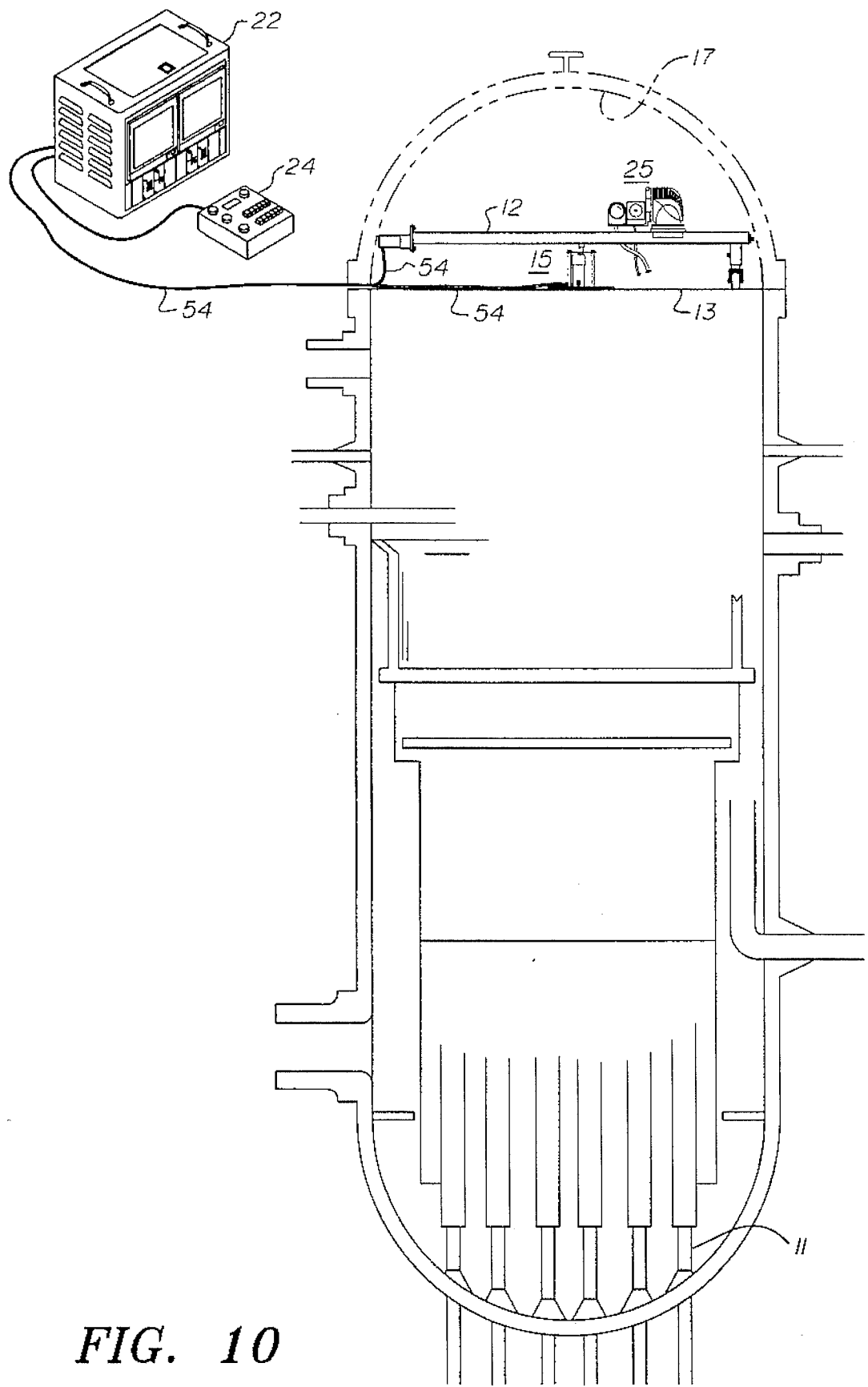
FIG. 10 is a perspective view of the entire system of the present invention.

In operation, as shown in FIG. 9, when the drive screw 30 is rotated in a first direction, the camera and light assembly 25 on chassis 35 and support plate 41 of the present invention slide along the drive screw 30 in a first longitudinal direction with respect to the boom member 12 as shown by arrow A. When the drive screw is rotated in a second direction, the light and camera assembly 25 slide along the drive screw 30 in a second direction with respect to the beam member 12 as shown by Arrow B. The camera and light assembly 25 can thereby move along the entire length of the beam member 12 and in this way can scan the entire length of the reactor head.

Referring to FIGS. 4, 5 and 8, the camera and lighting assembly 25 of the present invention are shown and disclosed in greater detail. A key feature of the present invention is the provision of means to selectively rotate and position the camera and light assembly in both the vertical and horizontal directions. In a preferred embodiment, the means comprises two perpendicularly disposed AC or DC stepper, synchronous or servomotors 46, 48 which can rotate the camera and light assembly 25. The motors 46, 48 are connected to the support plate by a hood 50 which position the motors 46, 48 at right angles with respect to each other. Motor 46, as shown in FIGS. 4 and 5, and most particular,, Arrow D controls the vertical rotation of the camera and light assembly. As shown in FIG. 8, motor 48 controls the horizontal rotation of the camera and light assembly as shown in Arrow E.

As shown, in a camera and light assembly 25, the assembly comprises a CCD or video camera 51 coupled to a halogen lamp 53. Electric motor 46 is affixed to the camera and light assembly and facilitates the vertical rotational tilting of the camera and the lamp. Electric motor 48 facilitates the horizontal adjustment and pivoting of the video camera and halogen lamp 32 with respect to the boom member. As shown in FIG. 8, the reactor inspection system of the present invention is shown rotating horizontally with respect to the central pivot point 14. The system thus provides a complete 360 degree arc of rotation.

The operation of the present invention is now described with reference to the Figures. The inspection device of the present invention is initially set up as shown in FIGS. 1 and 9 on its base 15 on a surface to be inspected. The system, in the preferred embodiment, comprises the camera and light assembly 25 attached to a boom member 12, a drive screw for sliding the camera and light assembly 25 and motors 23, 32, 46, 48 for rotating the boom member, drive screw 30 and the camera and light assembly 25 in both a horizontal and vertical direction under the control of an external control module 22.

The first electric motor 32 rotates the boom member 12 with respect to the pivot point. The second motor 32 rotates the drive screw 30 so as to axially slide the camera and light assembly 25 along the boom member 14. The third and fourth motors 46, 48, as shown in FIGS. 4, 5 and 8, are utilized to horizontally and vertically rotate the camera and light assembly 25. Power and control wire 54 from the four motors as well as the camera and light assembly 25 are attached to an external control system with CRT monitor 22 with control button panel 24. In this respect, the camera and light assembly 25 can be fully rotated and horizontally and vertically positioned as required, thus permitting the full visual inspection of the critical areas to be inspected. In particular, the present invention can be used for the inspection of the CRDM (Control Rod Drive Mechanism) penetrations, the thermal sleeves, funnels and the annulus between CRDM penetrations and the thermal sleeves in a nuclear reactor.

The present invention has been described with reference to the above-described preferred embodiment. It is to be appreciated that other embodiments fulfill the spirit and scope of the present invention and that the true nature and scope of the present invention is to be determined with reference to the claims appended hereto.

We claim:

1. Apparatus for inspecting a nuclear reactor comprising:
   a boom rotatably connected to a pivot point on a base;
   means for controllably rotating the boom with respect to said pivot point on said base; and
   a camera assembly affixed to said boom and being longitudinally slidable thereto such that the camera assembly may be slidably adjusted with respect to said boom.

2. Apparatus of claim 1 further comprising means for adjusting said camera assembly in a vertical direction.

3. Apparatus of claim 1 further comprising means for adjusting said camera assembly in a horizontal direction.

4. Apparatus of claim 1 further comprising a light means lamp affixed to said camera assembly for illuminating said nuclear reactor.

5. Apparatus of claim 1 wherein said camera assembly is slidably adjustable by a drive screw situated longitudinally along the boom, which is in threaded connection with said camera assembly, such that when said drive screw is rotated in a first direction, the camera assembly slides in a first longitudinal direction along said boom, and when said screw is rotated in a second longitudinal direction, the camera assembly slides in the second direction with respect to said boom.

6. Apparatus of claim 1 further comprising a control module for controlling the rotation of the boom and the sliding of the camera assembly.

7. Apparatus for inspecting the reactor head of a nuclear reactor comprising:
   a boom rotatably connected to a base at a pivot point, said base being affixed atop a nuclear reactor, said boom having a caster at one end such that said boom can rotate with respect to said pivot point and said caster;
   means for selectively rotating and positioning said boom and said caster about said pivot point;
   a camera slidably mated with said boom between first and second positions on said boom;
   means for slidably moving said camera between said first and second positions along said boom;
   means for rotating said camera means in a first direction with respect to said boom; and
   means for rotating said camera means in a second direction with respect to said boom.

8. Apparatus of claim 7 wherein said first direction is the horizontal direction.

9. Apparatus of claim 7 wherein said second direction is the vertical direction.

10. The apparatus of claim 7 further comprising light means connected to said camera for illuminating the area to be inspected by said camera.

11. Apparatus for inspecting the reactor head of a nuclear reactor comprising:
    a boom rotatably fixed about a pivot point on said reactor head, said boom having a caster at one end such that said boom can rotate 360° with respect to said pivot point and said caster;
    means for rotating said boom about said caster;
    camera and light means slidably mated with said boom such that said camera and light means can move between first and second positions on said boom; and
    means for moving said camera and light means between said first and second positions on said boom.

12. A method for inspecting a nuclear reactor comprising the following steps:
    (a) affixing a camera to a boom member;
    (b) placing said boom member and camera on a rotational pivot point set on a position in said reactor and
    (c) selectively rotating said boom member such that said camera and boom member can be selectively positioned within said reactor; and
    (d) selectively rotating said camera and boom member can be selectively positioned within said reactor.

* * * * *